United States Patent
Fynbo et al.

(10) Patent No.: US 12,025,097 B2
(45) Date of Patent: Jul. 2, 2024

(54) CONTROLLING THE YAW TO REDUCE MOTOR SPEED

(71) Applicant: VESTAS WIND SYSTEMS A/S, Aarhus N. (DK)

(72) Inventors: Peter Fynbo, Ørsted (DK); Jesper Lykkegaard Neubauer, Hornslet (DK); Jens-Kristian Egsgaard Langkjær, Aarhus N (DK); Niels Henrik Pedersen, Aarhus N (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 21 days.

(21) Appl. No.: 17/916,341

(22) PCT Filed: Mar. 29, 2021

(86) PCT No.: PCT/DK2021/050093
§ 371 (c)(1),
(2) Date: Sep. 30, 2022

(87) PCT Pub. No.: WO2021/197560
PCT Pub. Date: Oct. 7, 2021

(65) Prior Publication Data
US 2023/0151796 A1 May 18, 2023

(30) Foreign Application Priority Data
Mar. 30, 2020 (DK) .......................... PA 2020 70196

(51) Int. Cl.
*F03D 7/02* (2006.01)
*F03D 7/04* (2006.01)

(52) U.S. Cl.
CPC ........... *F03D 7/0204* (2013.01); *F03D 7/047* (2013.01); *F05B 2240/40* (2013.01); *F05B 2270/1095* (2013.01); *F05B 2270/111* (2013.01)

(58) Field of Classification Search
CPC .. F03D 1/181; F03D 7/0204; F05B 2270/329; F05B 2270/1095; F05B 2270/602; F05B 2270/111; F05B 2240/40
See application file for complete search history.

(56) References Cited

U.S. PATENT DOCUMENTS 6,945,752 B1 *  9/2005  Wobben .............. F03D 7/0204
                                                         290/44
7,944,070 B2 *  5/2011  Rosenvard ........... F03D 7/0248
                                                         290/55
(Continued)

FOREIGN PATENT DOCUMENTS

| EP | 2189656 A2 | 5/2010 |
|---|---|---|
| WO | 2018157897 A1 | 9/2018 |
| WO | 2021197560 A1 | 10/2021 |

OTHER PUBLICATIONS

Danish Patent and Trademark Office, 1st Technical Examination including The Search Report and Search Opinion for Application PA 2020 70196 dated Sep. 15, 2020.
(Continued)

*Primary Examiner* — Justin D Seabe
(74) *Attorney, Agent, or Firm* — Patterson + Sheridan, LLP

(57) ABSTRACT

Techniques for controlling the yaw of a wind turbine system by controlling a plurality of yaw drive actuators.
When the yaw drive actuators are applying the same torque to all the motors, this can lead to some motors overspeeding, if the motor is not engaged when the yaw system is activated.

(Continued)

Figure 1:
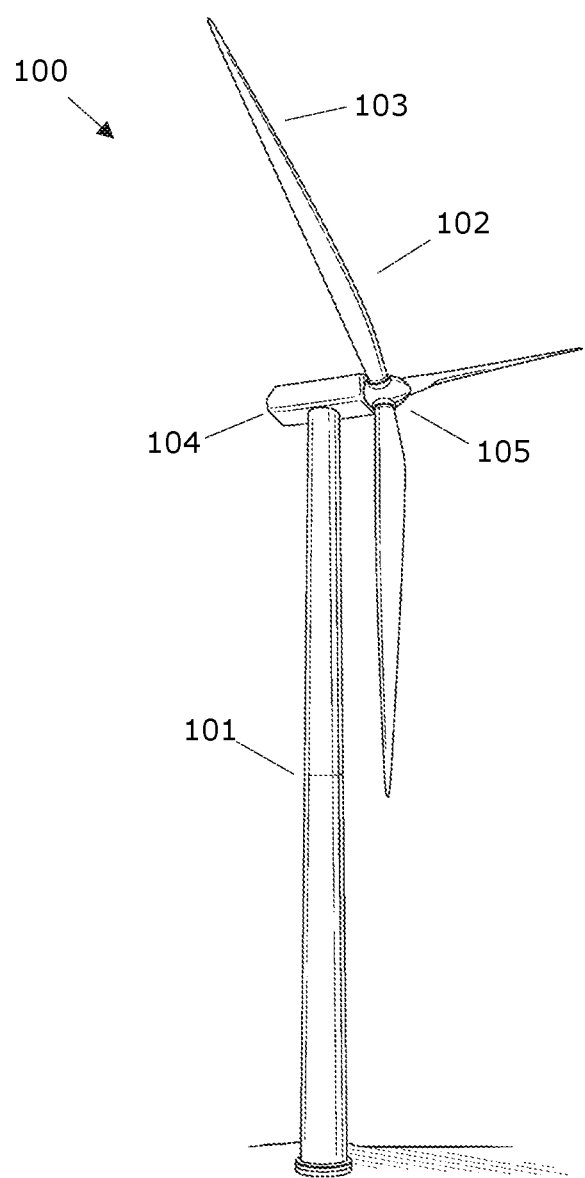

Therefore, if the actual motor speed reference of a yaw drive actuator is higher than a specific motor speed reference, then an output signal to reduce the actual motor speed reference is applied to the yaw drive actuators with an actual motor speed reference higher than the specific motor speed reference.

16 Claims, 7 Drawing Sheets

(56) References Cited

U.S. PATENT DOCUMENTS

| | | | |
|---|---|---|---|
| 8,162,608 | B2 | 4/2012 | Birkemose et al. |
| 11,280,316 | B2* | 3/2022 | Müller ............... F03D 80/70 |
| 2011/0318178 | A1 | 12/2011 | Andersen |
| 2012/0134807 | A1 | 5/2012 | Axelsson et al. |
| 2013/0088009 | A1 | 4/2013 | Cousineau et al. |
| 2015/0275858 | A1* | 10/2015 | Frederiksen ......... F03D 7/0204 |
| | | | 415/4.5 |
| 2018/0135598 | A1 | 5/2018 | Rosenvard et al. |
| 2018/0180029 | A1* | 6/2018 | Caponetti ............. F03D 17/00 |
| 2019/0003457 | A1* | 1/2019 | Miranda ............. F03D 7/0296 |

OTHER PUBLICATIONS

PCT, International Search Report for Application PCT/DK2021/050093 dated Feb. 7, 2021.

PCT, Written Opinion of The International Searching Authority for Application PCT/DK2021/050093 dated Feb. 7, 2021.

\* cited by examiner

CONTROLLING THE YAW TO REDUCE MOTOR SPEED

FIELD OF THE INVENTION

The present invention relates to a method for controlling the yaw of a wind turbine system, more particular for controlling the plurality of yaw drive actuators to avoid the motors of the yaw drive actuators to over-speed.

BACKGROUND OF THE INVENTION

The yaw system has the task of orienting the nacelle into relation to the wind. Most of the time the yaw system is inactive or parked. Only when the orientation of the rotor and the nacelle need to be changed, usually due to changes in the wind direction, the yaw system is active to turn the nacelle into the wind.

In a normal operation mode, the deviation between the nacelle and the wind direction, the yaw angle, is supposed to be as small as possible to avoid power production loss and to reduce loads. However, at the same time the yaw system must not respond to sensitively, to avoid continuous small yaw movements, which would reduce the life of the mechanical components.

In modern wind turbine systems a plurality of yaw drive actuators are used in the yaw system to orient the nacelle in relation to the wind.

However, if all yaw drive actuators are applying the same torque to all the motors this can lead to some motors overspeeding, if the motor is not engaged when the yaw system is activated.

Hence, an improved method for controlling the yaw system would be advantageous, and in particular a more efficient and/or reliable method to control a plurality of yaw drive actuators would be advantageous.

SUMMARY OF THE INVENTION

It is an object of the invention to provide, when the yaw system is active, a method to avoid or at least reduce overspeeding of a motor in a yaw drive actuator.

It is also an object of the invention to improve control methods of wind turbines, particularly to controlling methods, which improve lifetime of components of the yaw system.

Thus, the above described objects and several other objects are intended to be obtained in a first aspect of the invention by providing a method for controlling the yaw of a wind turbine system, the wind turbine system comprises a nacelle, a tower, a turbine controller and a yaw system, the yaw system is operable to yaw the nacelle with respect to the tower, the yaw system comprises a motor controller and a plurality of yaw drive actuators, wherein, the motor controller receives an actual motor speed reference of each yaw drive actuator, and if the actual motor speed reference of a yaw drive actuator is higher than a specific motor speed reference, then an output signal to reduce the actual motor speed reference is applied to the yaw drive actuators with an actual motor speed reference higher than the specific motor speed reference.

To avoid too high or prolonged over-speed of a motor in a yaw drive actuator, the motor controller sends an output signal to the yaw drive actuator to reduce the actual motor speed when over-speed is detected. The advantage of reducing over-speed is that the load of the motor is reduced, and thereby lowering the risk of overloading the motor and/or the motor controller, with a possible failure that might close down and stop. Further, by avoiding overloading a motor and/or motor controller, the lifetime of the motor and/or motor controller may be increased. Yet a further advantage relates to avoidance of peak loads on the yaw gear system (pinion and yaw ring) resulting from a speeding motor, Motor over-speed is generally set a given speed above which prolonged operation cannot be sustained. Motor over-speed may e.g. be set as for motor speeds exceeding the specified design limit of the motor. However motor over-speed may also be set as a function of the design limit, such as at a given speed above or below the design limit.

The yaw system comprises a plurality of yaw drive actuators, each comprising a motor and a pinion connecting the yaw drive actuator. The yaw system further comprises a yaw ring to which the plurality of actuators are connected. The yaw ring it located on the tower to allow the nacelle to rotate. Further, the yaw drive actuators comprises a variable frequency drive. In this document, the variable frequency drives are generally considered part of the yaw drive actuators even though the variable frequency drives can be located separated from the other parts of the motor.

Yawing or rotating is understood as is common in the art, as rotation of the nacelle.

The motors are preferable electrical drive motors which typically will be asynchronous induction motors, but also can be permanent magnet motors and are each powered by a separate variable frequency drive, enabling individual motor control. The variable frequency drives are connected to the motor controller in the yaw system and receives an output signal from the motor controller. The output signal is a required motor torque reference from the motor controller, but in case a motor is overspeeding, the output signal is reduced to a reduced motor torque reference. Alternatively, the motors can be hydraulic drive motors.

A tower can be any support structure or construction on which one or more nacelles can be mounted and be rotatable relative to the tower. The tower can comprise support arms, with nacelles mounted on each support arm; therefore, the wording "to rotate the nacelle with respect to the tower" also covers when a nacelle placed on a support arm is rotated. Further, an embodiment is possible, wherein the support arms are rotatable relative to the tower, so that the nacelles all are rotated simultaneous relative to the tower, when the support arms are rotated relative to the tower; therefore, the wording "to rotate the nacelle with respect to the tower" also covers this situation.

According to an embodiment, the method comprises that the motor controller, as a feedback signal, receives a mean motor speed reference. The mean motor speed reference can be determined by the turbine controller or by the motor controller itself. If the motor controller determines the mean motor speed reference this is done in a separate computing block as to the computing block handling the feedback control.

The mean motor speed reference is used to determine whether a motor is overspeeding.

According to an embodiment, the method comprises that the specific motor speed reference is the mean motor speed reference where to a threshold value is added. Adding a threshold value to the mean motor speed reference to determine whether a motor is running faster than the mean motor speed reference where to a threshold value is added is used to make an early detection of whether a motor might be moving towards overspeeding. All motors should preferable rotate with the same speed, therefore, if a motor moves more than a threshold value faster than the mean motor speed reference, it is a sign the motor is moving towards overspeeding and therefore measures is taken to reduce the speed of the motor.

According to an embodiment, the method comprises that the specific motor speed reference is a maximum motor speed reference.

The maximum motor speed reference is a maximum value that the motors should not exceed, even though it may be possible for a motor to run a little faster than the maximum motor speed. This is to avoid overloading the motor and to avoid the motor closing down. Therefore, if the motor speed is higher than the maximum motor speed measures is taken to reduce the speed of the motor. The maximum motor speed reference will typically be stored as a parameter in computer memory entered when setting up the system.

According to an embodiment, the method comprises that the motor controller receives from the turbine controller
- a requested motor speed reference, as an input signal, and the motor controller provides
- a required motor torque reference, as an output signal, for the plurality of yaw drive actuators to rotate the nacelle, determined according to the requested motor speed reference and the mean motor speed reference.

By basing the required motor torque reference for the plurality of yaw drive actuators on a mean motor speed reference as feedback signal, a control scheme with a virtual master drive is provided, the virtual master drive being constructed based on the mean motor speed. The virtual master drive is that all yaw drive actuators receives the same required motor torque references, acting together, as if there were only one yaw drive actuator. Therefore, the visual master drive is controlling all the yaw drive actuators that are running normally, not running in over-speed or in any other special mode. In this way, loads are shared in relation to the virtual master drive that is in accordance with a drive operating with the mean speed. As a result, the invention is particularly, but not exclusively, advantageous for obtaining an even load distribution for a plurality of yaw drive actuators. Hereby each yaw drive actuator substantially delivers the same torque, performs an even action avoiding imbalances, and avoids a single yaw drive actuator to be overloaded and thereby improve lifetime of the yaw system as well as production capabilities of the wind turbine due to reduced down time, where the wind turbine is not producing power.

However, when one motor is overspeeding, for instance because the pinion is not engaged with the yaw ring, the motor overspeeding need special treatment, and then is not part of the virtual drive, where all yaw drive actuators receives the same signal.

According to an embodiment, the method comprises that the output signal to reduce the actual motor speed reference, applied to the yaw drive actuator with an actual motor speed reference higher than the specific motor speed reference, is a reduced motor torque reference.

The motor controller sends the required motor torque reference to all the yaw drive actuators. However, if it is determined that a motor is overspeeding or at least running faster than the specific motor speed reference, then the required motor torque reference, sent to the specific yaw drive actuator with the overspeeding motor, is a reduced motor torque reference. Hereby, the speed of the overspeeding motor will be reduced, reducing the risk of the motor shutting down.

According to an embodiment, the method comprises that the reduced motor torque reference is the required motor torque reference reduced by a factor or a percentage.

Different strategies can be applied to reduce the motor speed by applying a reduced motor torque reference. The reduced motor torque reference can be a percentage subtracted from the required motor torque reference, or the required motor torque reference can be divided by a factor.

According to an embodiment, the method comprises that the reduced motor torque reference is reduced proportionally from the required motor torque reference relative to the detected speed.

The reduced motor torque reference can be a proportional reduction of the required motor torque reference calculated based in the mean motor speed reference from the motors running normally, for instance if the motor is running 30% to fast, the reduced motor torque reference is set to be 30% lower.

According to an embodiment, the method comprises that if an output signal to reduce the actual motor speed reference is applied to a yaw drive actuator, the remaining yaw drive actuators receives an output signal to increase the actual motor speed reference.

If a motor is overspeeding, it is doing so because the yaw drive actuator is not engaged with the yaw ring and therefore not participating in the actual yawing putting a higher load on the motors of the other yaw drive actuators. It can therefore be advantageous to increase the speed of the motors of the yaw drive actuators running normally, by increasing the required motor torque reference for these motors to increase the motor speed for these motors so they can compensate for the motors, which is not engaged with the yaw ring.

According to an embodiment, the method comprises that the mean motor speed reference is calculated as the average of the actual motor speed reference of all motors.

According to an embodiment, the method comprises that each yaw drive actuator comprises a motor, and the mean motor speed reference is calculated as the average of the actual motor speed reference of a selected subgroup of motors.

According to an embodiment, the method comprises that the selected subgroup of motors do not include, in the calculation of the mean motor speed reference, the motors with an actual motor speed reference higher than a high-speed threshold speed and/or the motors with an actual motor speed reference lower than a low-speed threshold speed.

It is advantageous to be able to exclude some motors from the calculation of the mean motor speed reference in case some motors are not operating or are operating with speeds that differs considerable from the other motors. This can happen typically when starting up the yawing, if an actuator has to rotate a larger distance than the other actuators for the pinion to engage with the gear of the yaw ring. This can for instance happen, if there is a broken tooth in the yaw ring. Therefore, the overspeeding motors are excluded from the calculation of the mean motor speed reference, and thereby excluded from effecting the calculation of the required motor torque reference for the normally running motors.

According to an embodiment, the method comprises that the wind turbine system comprises a plurality of nacelles and the yaw system is arranged to rotate one or more of the plurality of nacelles. Thus, the method of the invention can also be applied to a multi-rotor wind turbine.

In a multi-rotor turbine, the nacelles may be mounted on support arms or other support structures allowing more nacelles mounted on the same wind turbine system. The method of the invention can be used to the plurality of nacelles individually, so that a single nacelle placed on a support arm can be rotated while the other nacelles are not being rotated. The method can also be used to rotate all the nacelles by rotating the entire structure, on which the plurality of nacelles are mounted, so that the plurality of nacelles are rotated simultaneous. The plurality of nacelles are then rotated relative to the tower and therefore each individual nacelle is also rotated relative to the tower.

A second aspect of the invention relates to a control system for controlling the yaw of a wind turbine, where the control system is arranged to perform the steps according to the method of the first aspect.

A third aspect of the invention relates to a wind turbine, where the wind turbine further comprises a control system for controlling the yaw of the wind turbine system according to the second aspect.

A fourth aspect of the invention relates to a computer program product comprising software code adapted to control a wind turbine when executed on a data processing system, the computer program product being adapted to perform the method of the first aspect.

The different parts of the motor controller, the dynamical speed limiter, the speed control the torque limiter etc. can be implemented in separate computer programs or as different functions in the same computer program running on the same or on separate microprocessors. Likewise, the motor controller and the turbine controller can be implemented in different software programs running on separate computers or microprocessors, or be implemented in the same software programs running on the same computer or microprocessor or in any combination hereof.

In general, the various aspects and embodiments of the invention may be combined and coupled in any way possible within the scope of the invention. These and other aspects, features and/or advantages of the invention will be apparent from and elucidated with reference to the embodiments described hereinafter.

Figure 2:
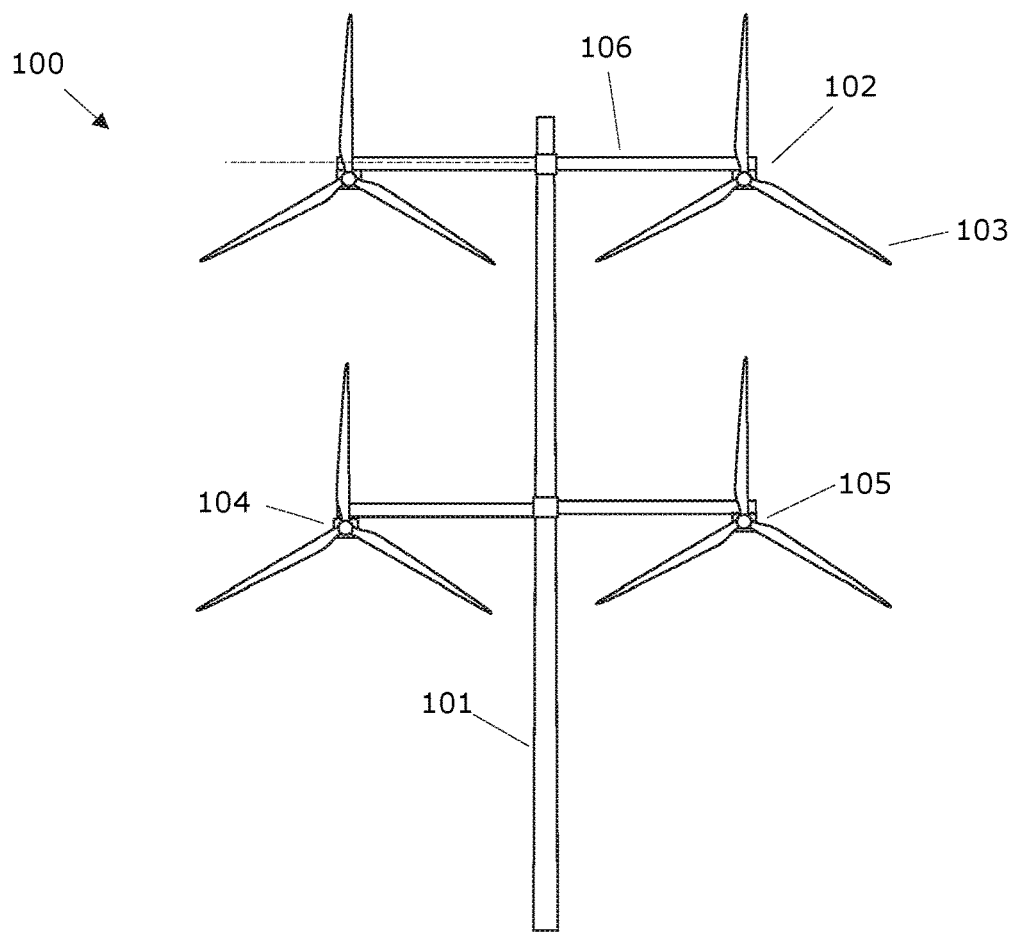
Figure 2:
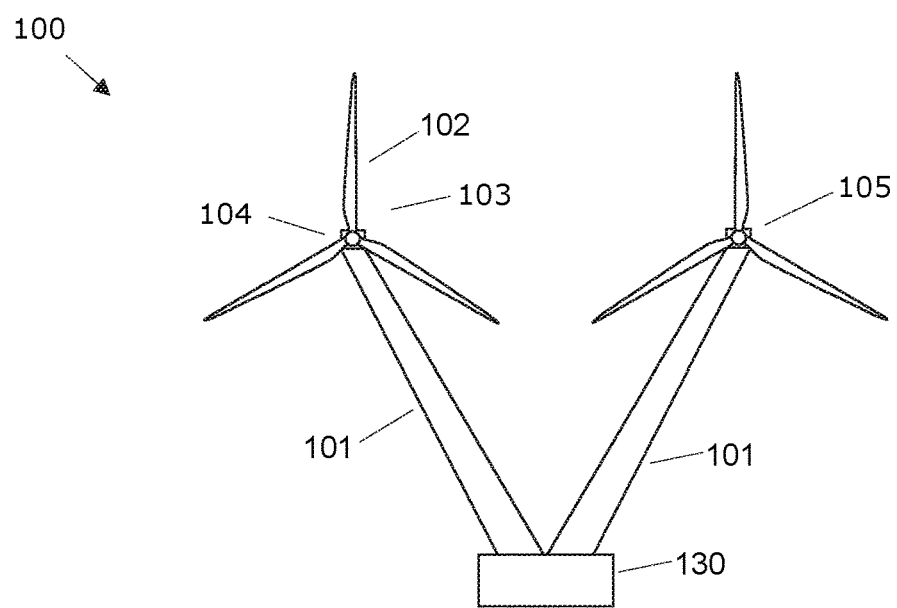
Figure 3:
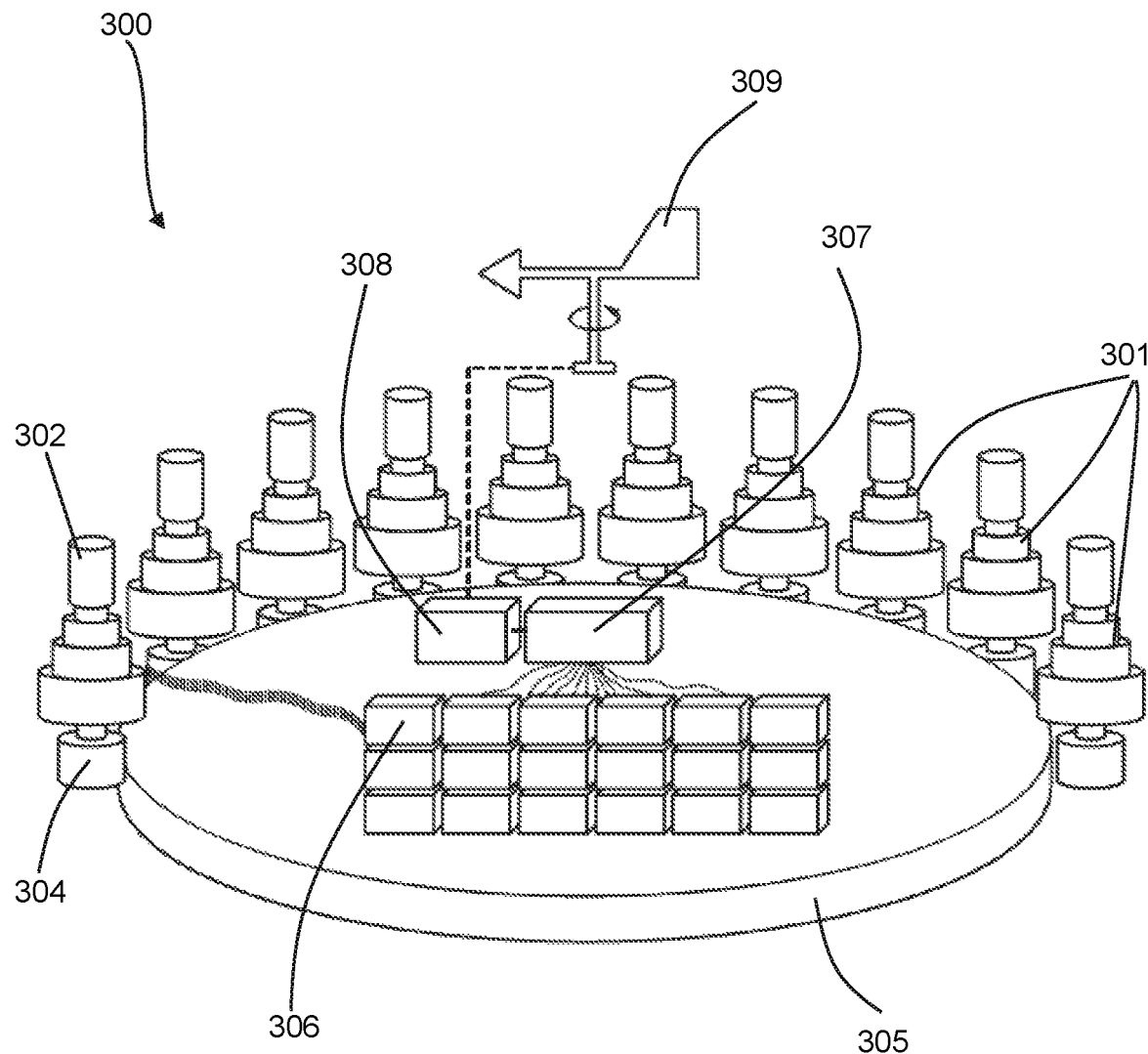
Figure 4:
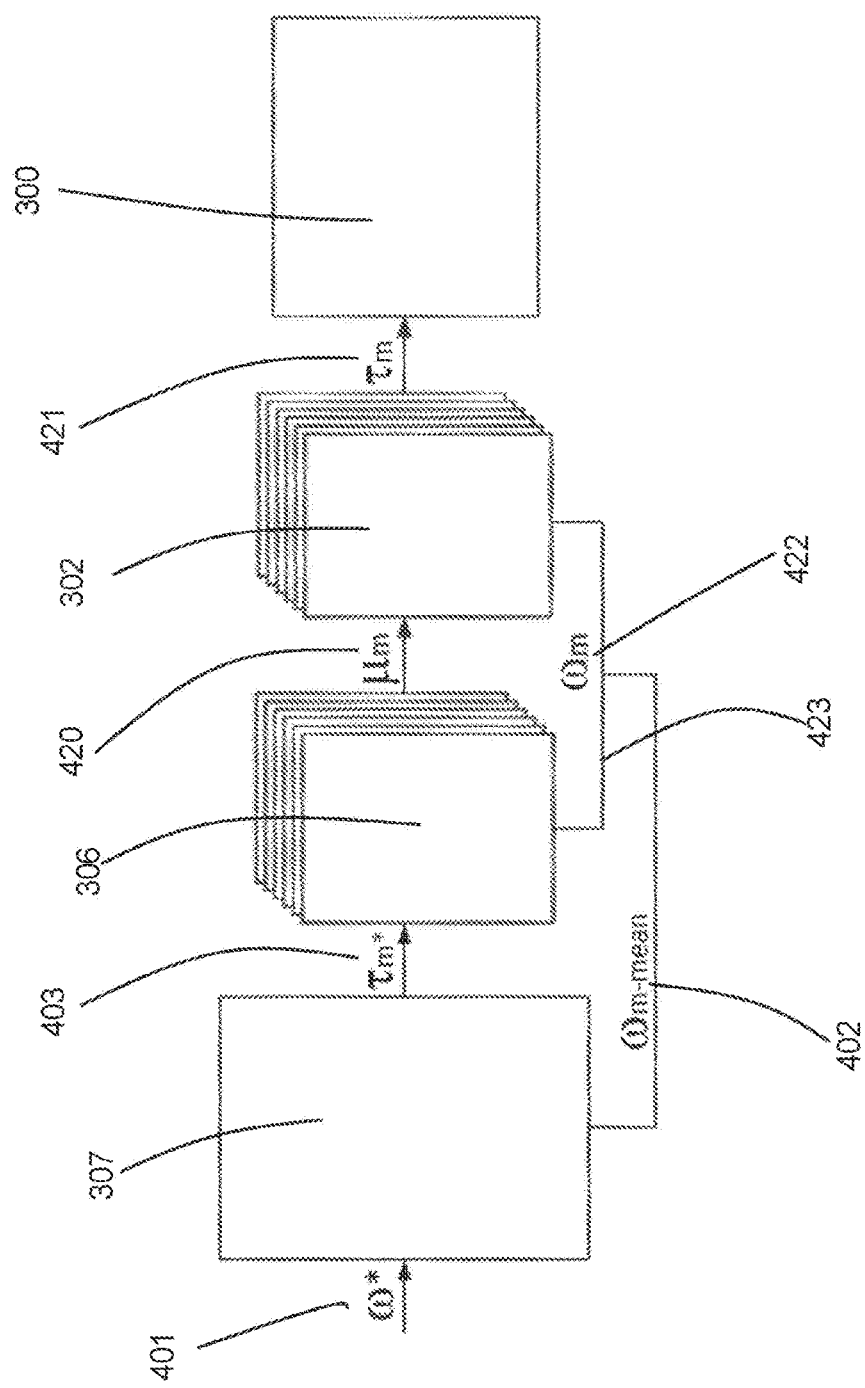
Figure 5:
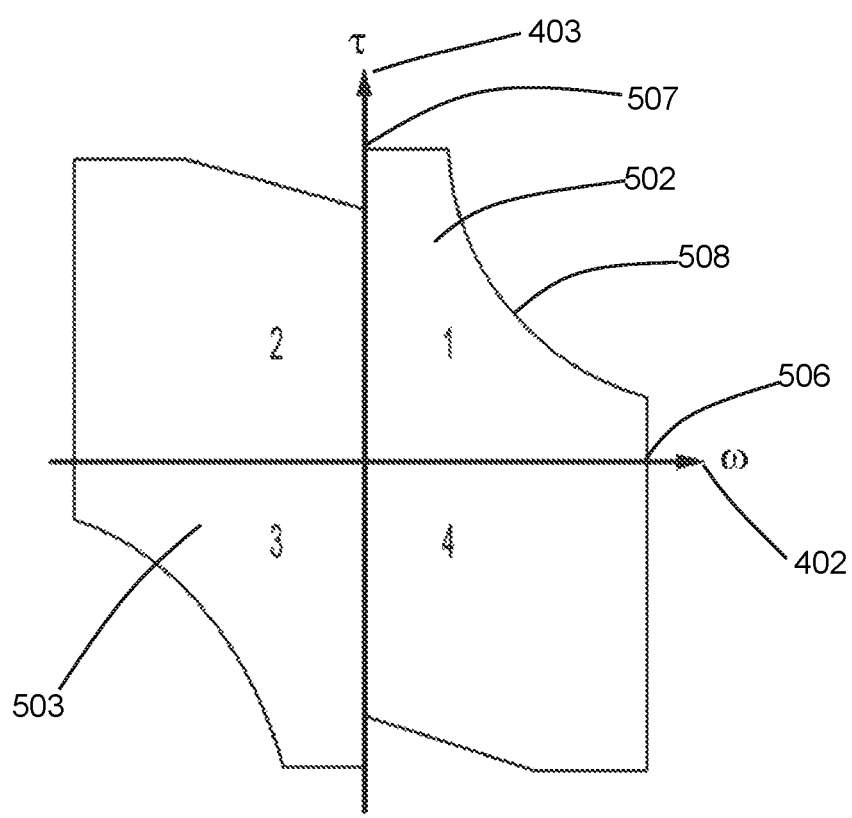
Figure 6:
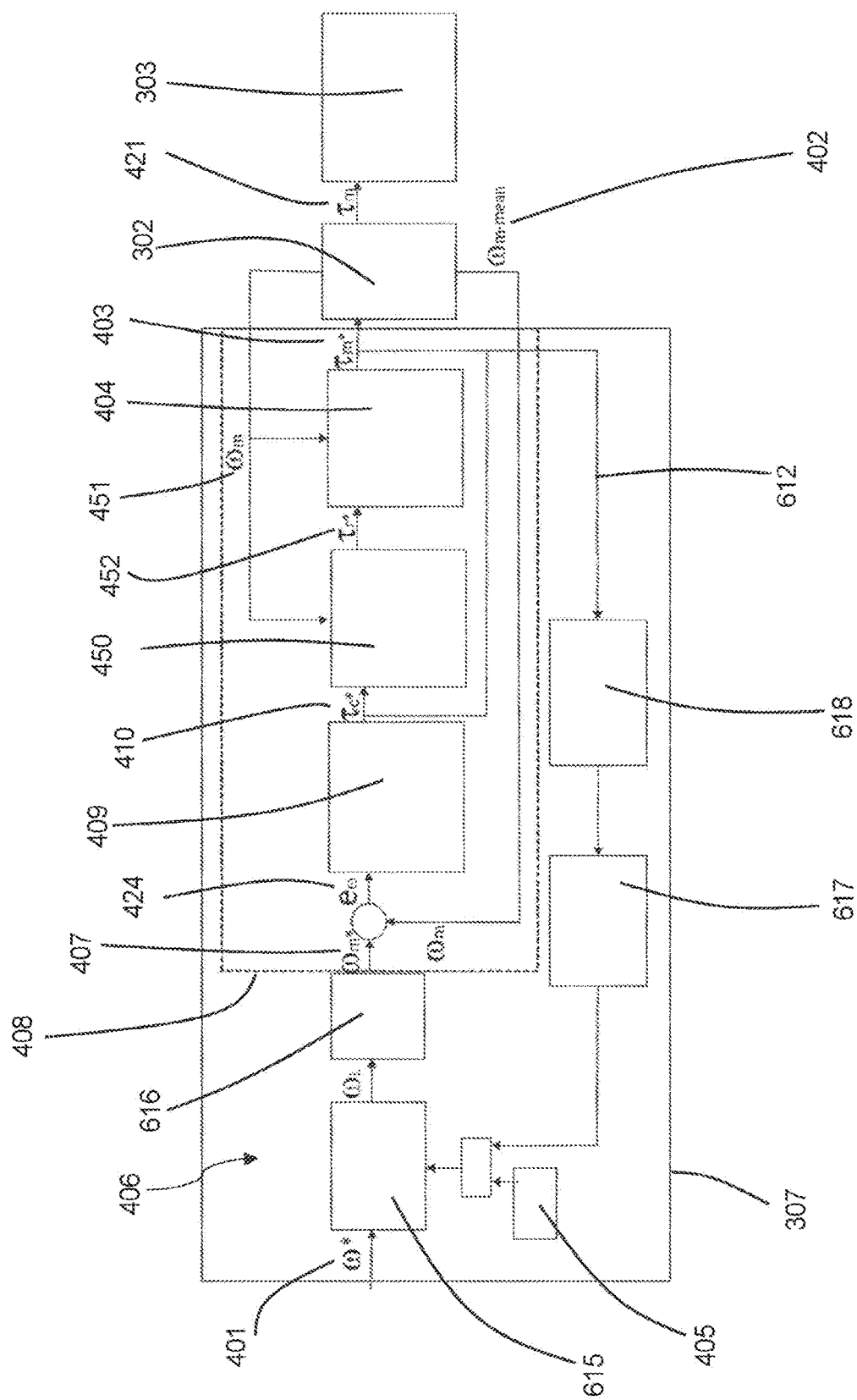

Embodiments of the invention will be described, by way of example only, with reference to the drawings, in which
FIG. 1 illustrates a wind turbine,
FIG. 2 illustrates wind turbines configured as multi-rotor wind turbines,
FIG. 3 illustrates the yaw system,
FIG. 4 illustrates the yaw control,
FIG. 5 illustrates the operation envelope,
FIG. 6 illustrates the motor controller for each drive.
FIG. 7 illustrates the difference running with over-speed protection and without over-speed protection.

The figures show one way of implementing the present invention and is not to be construed as being limiting to other possible embodiments falling within the scope of the attached claim set.

DETAILED DESCRIPTION OF EMBODIMENTS

FIG. 1 shows a wind turbine 100 (WTG) comprising a tower 101 and a rotor 102 with at least one rotor blade 103. Typically, three blades are used, but a different number of blades can also be used. The blades 103 are connected with the hub 105, which is arranged to rotate with the blades. The rotor is connected to a nacelle 104, which is mounted on top of the tower 101 and being adapted to drive a generator situated inside the nacelle via a drive train. The rotor 102 is rotatable by action of the wind. The wind induced rotational energy of the rotor blades 103 is transferred via a shaft to the generator. Thus, the wind turbine 100 is capable of converting kinetic energy of the wind into mechanical energy by means of the rotor blades and, subsequently, into electric power by means of the generator. The generator is connected with a power converter.

FIG. 2 shows alternative wind turbines 100 configured as multi-rotor wind turbines. Multi-rotor wind turbines comprises a plurality of nacelles 104. Here an example of 4 nacelles is shown, but in general two or more nacelles may be used in a multi-rotor turbine. The nacelles 104 can be supported, as illustrated in the upper drawing, via a tower 101 and support arms 106 extending outwardly from the tower 101 so that the nacelles are placed away from the tower and on opposite sides of the tower. In multi-rotor wind turbines, the yaw system can be placed at the tower for collective rotation of an arm structure, and/or as individual yaw systems for each nacelle. Another example of a multi-rotor structure is illustrated in the lower drawing, here the nacelles 104 are supported by angled towers 101 extending from a foundation 130, e.g. a ground or floating foundation, so that two or more nacelles 104 are sufficiently separated from each other at a given height. Embodiments of the present invention may be used with multi-rotor wind turbines or single-rotor wind turbines.

FIG. 3 shows an embodiment of a yaw system in accordance with the present invention. In the illustrated example, the yaw system comprises a plurality of yaw drive actuators 301. In other configurations, more or less yaw drive actuators may be used. Each yaw drive actuator 301 comprises a motor 302, in this embodiment an electrical drive motor, and a pinion 304. Additionally a gearing may be included. The pinion 304 is connecting the yaw drive actuator 301 and the yaw ring 305. Further, the yaw drive actuator 301 comprises a variable frequency drive (VFD) 306.

The motors 302 may be of the asynchronous induction motor type, each being powered by a separate variable frequency drive 306, and enabling individual motor control. The frequency drives 306 are seen in FIG. 3 to be clustered in a cabinet in the centre and being connected to the motor controller 307, however the frequency drives 306 can be placed in other locations as well.

The motor 302 comprises an encoder, which is a position meter, detecting the position of the motor, and from the changes in the position, the motor speed can be derived. The encoder is used to detect the speed of the motor 302 and return the speed to the frequency drive 306.

The encoder may be used for every motor 302 to detect the position and speed of the motor 302 and to ensure great load sharing, while avoiding overloading any of the motors 302.

The motor controller 307 outputs the required motor torque reference 403 to the variable frequency drives 306, and the motor controller 307 receives information about the motor speed either through communication with the encoder, the individual variable frequency drives 306 or through communication with the turbine controller 308, which calculates the mean motor speed reference 402. Further, the motor controller 307 receives signals from the main turbine controller 308 about when to yaw and in which direction based on input from the wind direction device 309.

The turbine controller 308 may control the yaw system 300, and the turbine controller 308 activates the motor controller 307 when yawing is needed.

FIG. 4 is a schematic illustration of an embodiment of the yaw control scheme. The yaw control comprises a centralized control structure, where a single motor controller 307 is operating all the yaw drive actuators 301 based on a requested motor speed reference 401 and a mean motor speed reference 402 of all the motors 302, or of a selected subgroup of the motors 302.

The selected subgroup of motors 302 might not include the fastest and/or the slowest motor 302 for increased robustness or the selected subgroup of motors 302 might not include motors 302 running faster than a high-speed threshold speed and/or slower than a low speed threshold speed.

Under normal operation the same torque, the required motor torque reference 403, is requested for all yaw drive actuators 301 to ensure even load distribution. However, the required motor torque reference 403 for each individual yaw drive actuator may be distributed unevenly, if requested, for instance when passing a yaw segment split where a reduced torque may be desired or during self-check where each drive is tested individually. Also, if a motor 302 is overspeeding the required motor torque reference 403 can differ for the yaw drive actuator 301 with the overspeeding motor 302 relative to the other yaw drive actuators 302.

The required motor torque reference 403 sent from the motor controller 307 to the yaw drive actuator is received by the variable frequency drives 306. The variable frequency drives 306 then sends a motor signal 420 to the motor 302, which is then applying the motor shaft torque 421 to the yaw system 300 and the pinion 304 to transfer the torque to the yaw ring 305.

Based on the motor speed 422 from each motor 302, the turbine controller 308 or the motor controller 307 calculates a mean motor speed reference 402 as a feedback signal. The motor controller may calculate it own feedback signal in a computing block separate from the control loop computing block. In addition, the motor speed for each motor 302 is sent as a feedback signal via the inner torque control loop 423 back to the variable frequency drive 306.

FIG. 5 shows an example of an operation envelope 501 used for 4-quadrant control of the motors. The operation envelope 501 is a coordinate system where the x-axis is the mean motor speed reference 402 and the y-axis is the required motor torque reference 403 applied to the motors 302.

The limited motor speed reference 407 (FIG. 6) calculated by the motor controller 307 is not allowed to be higher than the maximum motor speed 506. The maximum motor speed 506 is illustrated by the vertical curve part in the first quadrant 502.

The required motor torque reference 403 calculated by the motor controller 307 is not allowed to be higher than the maximum torque 507. The maximum torque 507 is illustrated by the horizontal curve part in the first quadrant 502.

The curved part 508 of the curve in the first quadrant 502 is illustrating the relationship between speed and torque under consideration of the maximum power use reference 405. When the motors are running with a high speed, the torque that can be applied is limited by the maximum power use reference 405.

The third quadrant 503 is equivalent to the first quadrant 502, only rotating the motors 302 in the opposite direction.

FIG. 6 illustrates a graphical illustration of an embodiment of the motor controller 307.

The objective for the motor controller 307 is to determine the required motor torque reference 403 needed to yield the requested motor speed reference 401.

The control strategy comprises two feedback control loops in a cascaded structure where both torque and speed control is used. The two feedback loops comprises an inner loop and an outer loop. The inner loop is shown on FIG. 4 as an inner torque control loop, where it is illustrated to be handled by the variable frequency drive 306, which receives the required motor torque reference 403 from the motor controller 307. While, the variable frequency drive 306 is not shown on FIG. 6 is placed between the motor controller 307 and the motor 302 as illustrated in FIG. 4.

The inner torque control loop 423 is handled by the variable frequency drive 306, such that the output is a torque reference for obtaining the desired motor torque. Ideally, the motor shaft torque 421 is equal to the required motor torque 403.

The outer feedback loop is illustrated in FIG. 6 as the speed control loop 612 returning the mean motor speed reference 402 to the speed control unit 408. The speed control unit receives the limited motor speed reference 407 as input signal and the mean motor speed reference 402 as a feedback signal and sends the required motor torque reference 403 as output to the motors 302.

The speed control unit consists of a PI controller 409, an over-speed damping function 450 and a torque limiter 404.

The PI-controller 409 is a proportional-integral controller used for speed control, since it yields unity DC-gain and great disturbance rejection. The speed control loop 612 refers the mean motor speed reference 402 back to the speed control unit 408. The mean motor speed reference 402 is subtracted from the limited motor speed reference 407 to give an error signal 424 as input to the PI controller 409, and the PI controller 409 provides the calculated motor torque reference 410 as output. The PI control can also be a PID control, but in the embodiment described, the derivative (D) part in the PID is zero.

The over-speed damping function 450 receives the calculated motor torque reference 410 as input from the PI-controller 409 and an actual motor speed reference 451 from each motor 302. In case over-speed is detected for a motor 302, the over-speed damping function 450 reduces the torque reference and sends a reduced motor torque reference as an output signal to the torque limiter 404 for the specific motor that is overspeeding. If a motor is not overspeeding, then the output signal is the calculated motor torque reference 410 received from the PI controller.

The torque limiter 404 limits the torque to the maximum torque 507 during operation in quadrant 1 and 3 in FIG. 5. The torque limiter 404 receives an output signal 452 from the over-speed damping function 450 and delivers the required motor torque reference 403 as an output signal. Preferable, the torque limiter 404 sends the same required motor speed reference 403 to all yaw drive actuators 301, but it can, in case of a motor overspeeding or other special cases, send a different required motor speed reference 403 to the individual yaw drive actuators 301.

The dynamical speed limiter 406 is used to limit the speed reference determining the limited motor speed reference 407. The requested speed reference 401 is received from the turbine controller 308, but may be reduced due to power limitation according to the maximum power use reference 405. Further, the speed can be reduced in the speed saturation routine 615 to not exceed the maximum power speed and the speed ramp routine 616 ensures not to accelerate the motors to exceed a maximum speed change rate.

A feedback of the required motor torque reference 403 for the yaw drive actuators running normally is also used by the dynamic speed limiter 406 after going through a low-pass filter 618 and a direction saturation filter 617, which ensures the feedback signal has a minimum numerical value and is not zero.

FIG. 7 is illustrating the advantage of using over-speed protection. FIG. 7a-b illustrates the method using over-speed protection. FIG. 7a illustrates motor speed using over-speed protection and FIG. 7b illustrates the resulting motor torque.

Figure 7A:
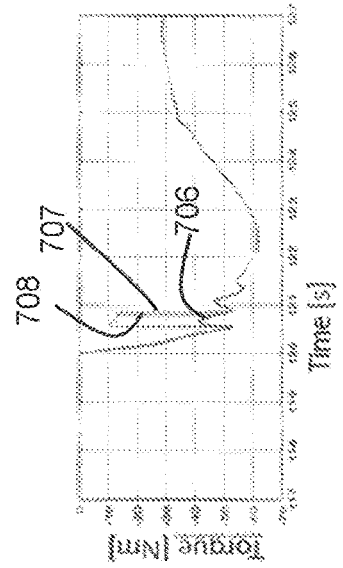
Figure 7B:
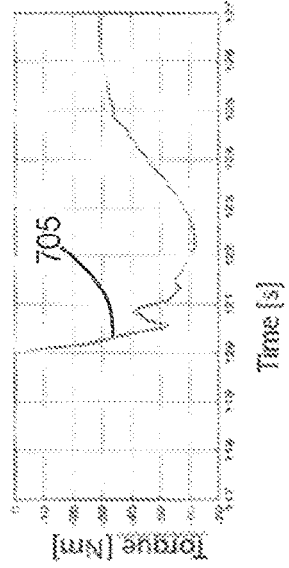
Figure 7C:
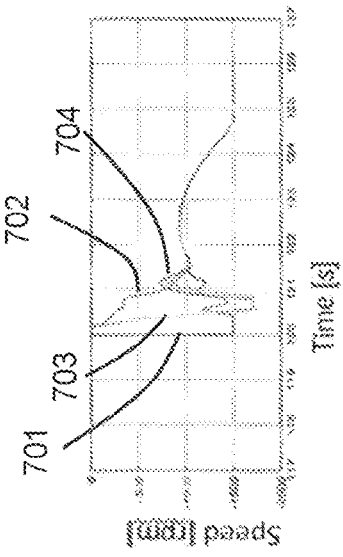
Figure 7D:
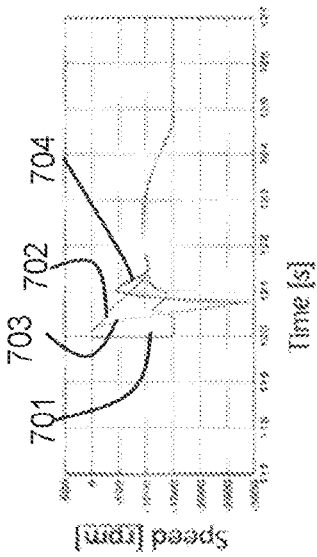

FIG. 7c-d illustrates not using over-speed protection. FIG. 7c illustrates the motor speed not using over-speed protection and FIG. 7d illustrates the resulting motor torque.

FIGS. 7a and 7c illustrates the speed reference 701 the motor receives as input and the speed 702 of the motors, which is engaged with the yaw ring. While the speed 703 and 704 are from two motors not engaged with the yaw ring. These two motors are therefore increasing the speed rapidly. FIG. 7c illustrates that the speed increases without over-speed protection while in FIG. 7a illustrates that the over-speed protection cuts of the speed. FIG. 7d illustrates that all motors applies the same torque 705 when no over-speed protection is used, while in FIG. 7b it is illustrated that when over-speed protections is used the two motor not engaged with the yaw ring applies a reduced torque 707, 708, while the motors engaged with the yaw ring applies the requested torque 706.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for controlling the yaw of a wind turbine system, the wind turbine system comprises a nacelle, a tower, a turbine controller and a yaw system, the yaw system is operable to rotate the nacelle with respect to the tower, the yaw system comprises a motor controller and a plurality of yaw drive actuators, the method, comprising:
   receiving, by the motor controller, an actual motor speed reference of each yaw drive actuator,
   receiving, by the motor controller, a mean motor speed reference of the plurality of yaw drive actuators or a subset of the plurality of yaw drive actuators, and
   upon determining that the actual motor speed reference of one or more yaw drive actuators of the plurality of yaw drive actuators is higher than a specific motor over-speed reference corresponding to a sum of a threshold value and the mean motor speed reference, applying an output signal, to the one or more yaw drive actuators, to reduce the actual motor speed reference of the one or more yaw drive actuators.

2. The method for controlling the yaw of a wind turbine system according to claim 1, wherein the specific motor over-speed reference is a maximum motor speed reference.

3. The method for controlling the yaw of a wind turbine system according to claim 1, wherein the motor controller receives from the turbine controller
   a requested motor speed reference, as an input signal, and the motor controller provides
   a required motor torque reference, as an output signal, for the plurality of yaw drive actuators to rotate the nacelle, determined according to the requested motor speed reference and the mean motor speed reference.

4. The method for controlling the yaw of a wind turbine system according to claim 3, wherein the output signal to reduce the actual motor speed reference, applied to the one or more yaw drive actuators with the actual motor speed reference higher than the specific motor over-speed reference, is a reduced motor torque reference to a corresponding torque limiter of the one or more yaw drive actuators.

5. The method for controlling the yaw of a wind turbine system according to claim 2, wherein the reduced motor torque reference is the required motor torque reference reduced by a factor or a percentage.

6. The method for controlling the yaw of a wind turbine system according to claim 2, wherein the reduced motor torque reference is reduced proportionally from the required motor torque reference relative to the detected over-speed.

7. The method for controlling the yaw of a wind turbine system according to claim 1, wherein, if an output signal to reduce the actual motor speed reference is applied to a yaw drive actuator, the remaining yaw drive actuators receives an output signal to increase the actual motor speed reference.

8. The method for controlling the yaw of a wind turbine system according to claim 1, wherein the mean motor speed reference is calculated as an average of the actual motor speed reference of all motors.

9. The method for controlling the yaw of a wind turbine system according to claim 1, wherein each yaw drive actuator comprises a motor, and the mean motor speed reference is calculated as an average of the actual motor speed reference of the subset.

10. The method for controlling the yaw of a wind turbine system according to claim 1, wherein the wind turbine system comprises a plurality of nacelles and the yaw system is arranged to rotate one or more of the plurality of nacelles.

11. The method for controlling the yaw of a wind turbine system according to claim 2, wherein the subset excludes, in the calculation of the mean motor speed reference, the motors with the actual motor speed reference that is higher than a high-speed threshold speed and/or the motors with an actual motor speed reference lower than a low-speed threshold speed.

12. The method of claim 1, wherein the mean motor speed reference is a mean motor speed reference of the subset of the plurality of yaw drive actuators.

13. The method of claim 12, wherein an actual motor speed reference of each drive actuator included in the subset of the plurality of yaw drive actuators is less than the specific motor over-speed motor reference.

14. A control system for controlling the yaw of a wind turbine system comprising a nacelle, a tower, and a yaw system operable to rotate the nacelle with respect to the tower; wherein the control system comprises:
   an input/output (I/O) interface; and
   one or more processors communicatively coupled to the (I/O) interface, and programmed to perform an operation, comprising:
      receiving, by a motor controller of the yaw system, an actual motor speed reference of each of a plurality of yaw drive actuators of the yaw system;
      receiving, by the motor controller, a mean motor speed reference of the plurality of yaw drive actuators or a subset of the plurality of yaw drive actuators; and
      upon determining that the actual motor speed reference of one or more yaw drive actuators of the plurality of yaw drive actuators is higher than a specific motor over-speed reference corresponding to a sum of a threshold value and the mean motor speed reference, applying an output signal, to the one or more yaw drive actuators, to reduce the actual motor speed reference.

15. The control system according to claim 14, wherein the specific motor over-speed reference is a maximum motor speed reference.

16. A wind turbine system, comprising:
a tower;
a nacelle disposed on the tower;
a yaw system operable to rotate the nacelle with respect to the tower, wherein the yaw system comprises a motor controller and a plurality of yaw drive actuators; and
a control system configured to perform an operation, comprising:
  receiving, by the motor controller, an actual motor speed reference of the yaw drive actuators of the yaw system;
  receiving, by the motor controller, a mean motor speed reference of the plurality of yaw drive actuators or a subset of the plurality of yaw drive actuators; and
  upon determining that the actual motor speed reference of one or more yaw drive actuators of the plurality of yaw drive actuators is higher than a specific motor over-speed reference corresponding to a sum of a threshold value and the mean motor speed reference, applying an output signal, to the one or more yaw drive actuators, to reduce the actual motor speed reference.

* * * * *